US010283983B2

(12) United States Patent
McCaffrey et al.

(10) Patent No.: US 10,283,983 B2
(45) Date of Patent: May 7, 2019

(54) REPOSITIONABLE SHELF SYSTEM FOR DEVICE CHARGING AND STORAGE CABINETS OR CARTS

(71) Applicant: Ergotron, Inc., St. Paul, MN (US)

(72) Inventors: Jeffrey T McCaffrey, Portland, OR (US); Stuart Ripley Aldrich, North Bennington, VT (US); Ronald Lee Elliott, Oregon City, OR (US); James Timothy Clift, Portland, OR (US); Pedro Antonio Carbajal, Tualatin, OR (US)

(73) Assignee: Ergotron, Inc., St. Paul, MN (US)

( * ) Notice: Subject to any disclaimer, the term of this patent is extended or adjusted under 35 U.S.C. 154(b) by 181 days.

(21) Appl. No.: 15/183,514

(22) Filed: Jun. 15, 2016

(65) Prior Publication Data
US 2016/0372949 A1    Dec. 22, 2016

Related U.S. Application Data

(60) Provisional application No. 62/182,810, filed on Jun. 22, 2015.

(51) Int. Cl.
 A47B 57/00    (2006.01)
 A47B 81/00    (2006.01)
 H02J 7/00    (2006.01)
(52) U.S. Cl.
 CPC ............ *H02J 7/0044* (2013.01); *A47B 57/00* (2013.01); *A47B 81/00* (2013.01); *H02J 7/0052* (2013.01)

(58) Field of Classification Search
 CPC ....................................................... H02J 7/0044
 (Continued)

(56) References Cited

U.S. PATENT DOCUMENTS 5,975,318 A * 11/1999 Jay .......................... A47F 5/101
 211/150
6,218,796 B1 * 4/2001 Kozlowski ............ G06F 1/1632
 318/139

(Continued)

*Primary Examiner* — Edward Tso
*Assistant Examiner* — Ahmed H Omar
(74) *Attorney, Agent, or Firm* — Schwegman Lundberg & Woessner, P.A.

(57) ABSTRACT

A charging station configured to charge a plurality of electronic devices, the charging station can include a charging cabinet having a first side, a second side, and a connecting member extending between the first and second sides; a first plurality of holes extending along the first side, the first plurality of holes being configured to receive a screw; a first plurality of slots extending along the second side, the first plurality of slots being configured to receive a tab; at least one shelf having a first end, a second end, and a shelf surface extending between the first and second ends, the first end of the shelf configured to be positioned adjacent the first side of the charging cabinet, the second end of the shelf configured to be positioned adjacent the second side of the charging cabinet, the at least one shelf including: a first tab extending from the second end of the at least one shelf, the first tab configured to be inserted into one of the first plurality of slots extending along the second side; and a shelf flange extending from the first end, wherein a first portion of the shelf flange and a first portion of the shelf surface define a first opening, and wherein the first opening is configured to receive the screw.

18 Claims, 6 Drawing Sheets

(58) Field of Classification Search
USPC .......................................................... 320/115
See application file for complete search history.

(56) References Cited

U.S. PATENT DOCUMENTS

| | | | |
|---|---|---|---|
| 8,267,261 B2* | 9/2012 | Vanderhoek | A01G 9/143 |
| | | | 211/150 |
| 2011/0193524 A1* | 8/2011 | Hazzard | G06F 1/1632 |
| | | | 320/114 |

* cited by examiner

FIG. 6B

REPOSITIONABLE SHELF SYSTEM FOR DEVICE CHARGING AND STORAGE CABINETS OR CARTS

CLAIM OF PRIORITY

This patent application claims the benefit of U.S. Provisional Patent Application Ser. No. 62/182,810, titled "REPOSITIONABLE SHELF SYSTEM FOR DEVICE CHARGING AND STORAGE CABINETS OR CARTS," by Jeffrey T. McCaffrey et al., and filed on Jun. 22, 2015, which is hereby incorporated by reference herein in its entirety.

OVERVIEW

This disclosure describes a shelf system that is designed to allow easy adjustment of shelves and shelf dividers.

To further illustrate the REPOSITIONABLE SHELF SYSTEM FOR DEVICE CHARGING AND STORAGE CABINETS OR CARTS disclosed herein, a non-limiting list of examples is provided here:

In Example 1, a charging station configured to charge a plurality of electronic devices, the charging station can comprise: a charging cabinet having a first side, a second side, and a connecting member extending between the first and second sides; a first plurality of holes extending along the first side, the first plurality of holes being configured to receive a screw; a first plurality of slots extending along the second side, the first plurality of slots being configured to receive a tab; at least one shelf having a first end, a second end, and a shelf surface extending between the first and second ends, the first end of the shelf configured to be positioned adjacent the first side of the charging cabinet, the second end of the shelf configured to be positioned adjacent the second side of the charging cabinet, the at least one shelf including: a first tab extending from the second end of the at least one shelf, the first tab configured to be inserted into one of the first plurality of slots extending along the second side; and a shelf flange extending from the first end, wherein a first portion of the shelf flange and a first portion of the shelf surface define a first opening, and wherein the first opening is configured to receive the screw.

In Example 2, the charging station of Example 1 can optionally be configured to further comprise a second plurality of holes extending along the first side, at least a portion of the second plurality of holes being configured to receive a screw; and wherein a first portion of the shelf flange and a first portion of the shelf surface define a second opening, and wherein the second opening is configured to receive the screw.

In Example 3, the charging station of any one or any combination of Examples 1-2 can optionally be configured to further comprise a second plurality of slots extending along the second side, at least a portion of the second plurality of slots being configured to receive a tab; and a second tab extending from the second end of the at least one shelf, the second tab configured to be inserted into one of the second plurality of slots extending along the second side.

In Example 4, the charging station of any one or any combination of Examples 1-3 can optionally be configured to further comprise a second plurality of holes extending along the first side, at least a portion of the second plurality of holes being configured to receive a screw; wherein a first portion of the shelf flange and a first portion of the shelf surface define a second opening, and wherein the second opening is configured to receive the screw; a second plurality of slots extending along the second side, at least a portion of the second plurality of slots being configured to receive a tab; and a second tab extending from the second end of the at least one shelf, the second tab configured to be inserted into one of the second plurality of slots extending along the second side.

In Example 5, the charging station of any one or any combination of Examples 1-4 can optionally be configured to further comprise a divider coupled to the at least one shelf and configured to provide multiple spaces for electronic devices.

In Example 6, the charging station of any one or any combination of Examples 1-5 can optionally be configured such that the at least one shelf is divided into a plurality of docking stations, each docking station having connectors for a power supply and a network connection.

In Example 7 the charging station of any one or any combination of Examples 1-6 can optionally be configured to further comprise a network connection system.

Example 8, the charging station of Example 7 can optionally be configured such that the network connection system includes a wireless transmitter.

In Example 9, the charging station of any one or any combination of Examples 1-8 can optionally be configured to further comprise a power supply system configured to provide electrical power to the plurality of electronic devices.

In Example 10, the charging station of any one or any combination of Examples 1-9 can optionally be configured to further comprise three shelves.

In Example 11, the charging station of any one or any combination of Examples 1-10 can optionally be configured such that the at least one shelf includes a front flange.

In Example 12, the charging station of any one or any combination of Examples 1-11 can optionally be configured such that the at least one shelf includes a rear flange.

In Example 13, the charging station of any one or any combination of Examples 1-12 can optionally be configured such that the at least one shelf includes at least one center flange.

Example 14, the charging station of any one or any combination of Examples 1-13 can optionally be configured such that the connecting member is at least one of a back member, a base member, or a top member of the charging cabinet.

In Example 15, the charging station of any one or any combination of Examples 1-14 can optionally be configured such that the charging cabinet includes a wheeled base.

In Example 16, a charging station configured to charge a plurality of electronic devices, the charging station can comprise: a charging cabinet having a first side, a second side, and a connecting member extending between the first and second sides; a first plurality of male positions extending along the first side, each of the first plurality of male positions being configured for one of 1) receiving a male fastener or 2) including an integral male protrusion; a first plurality of slots extending along the second side, the first plurality of slots being configured to receive a tab; at least one shelf having a first end, a second end, and a shelf surface extending between the first and second ends, the first end of the shelf configured to be positioned adjacent the first side of the charging cabinet, the second end of the shelf configured to be positioned adjacent the second side of the charging cabinet, the at least one shelf including: a first tab extending from the second end of the at least one shelf, the first tab configured to be inserted into one of the first plurality of slots extending along the second side; and a shelf flange extending from the first end, wherein a first portion of the shelf flange and a first portion of the shelf surface define a first opening, and wherein the first opening is configured to receive one of the integral male protrusion or the male fastener.

In Example 17, the charging station of Example 16 can optionally be configured to further comprise a second plurality of male positions extending along the first side, the each of the second plurality of male positions being configured for one of 1) receiving a male fastener or including an integral male protrusion; and wherein a first portion of the shelf flange and a first portion of the shelf surface define a second opening, and wherein the second opening is configured to receive one of the male fastener or the male protrusion.

In Example 18, the charging station of any one or any combination of Examples 16-17 can optionally be configured to further comprise a second plurality of slots extending along the second side, at least a portion of the second plurality of slots being configured to receive a tab; and a second tab extending from the second side of the at least one shelf, the second tab configured to be inserted into one of the second plurality of slots extending along the second side.

In Example 19, the charging station of any one or any combination of Examples 16-18 can optionally be configured to further comprise a second plurality of male positions extending along the first side, each of the second plurality male positions being configured for one of 1) receiving a male fastener or including an integral male protrusion; and wherein a first portion of the shelf flange and a first portion of the shelf surface define a second opening, and wherein the second opening is configured to receive one of the male fastener or the male protrusion; a second plurality of slots extending along the second side, at least a portion of the second plurality of slots being configured to receive a tab; and a second tab extending from the second side of the at least one shelf, the second tab configured to be inserted into one of the second plurality of slots extending along the second side.

In Example 20, the charging station of any one or any combination of Examples 16-18 can optionally be configured such that each of the plurality of male positions defines a hole and the male fastener is a screw.

In Example 21, the charging station of any one or any combination of Examples 1-20 can optionally be configured such that all elements, operations, or other options recited are available to use or select from.

These and other examples and features of the present charging station will be set forth in part in the following Detailed Description. This Overview is intended to provide non-limiting examples of the present subject matter—it is not intended to provide an exclusive or exhaustive explanation. The Detailed Description below is included to provide further information about the present height adjustable device and lift mechanisms.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
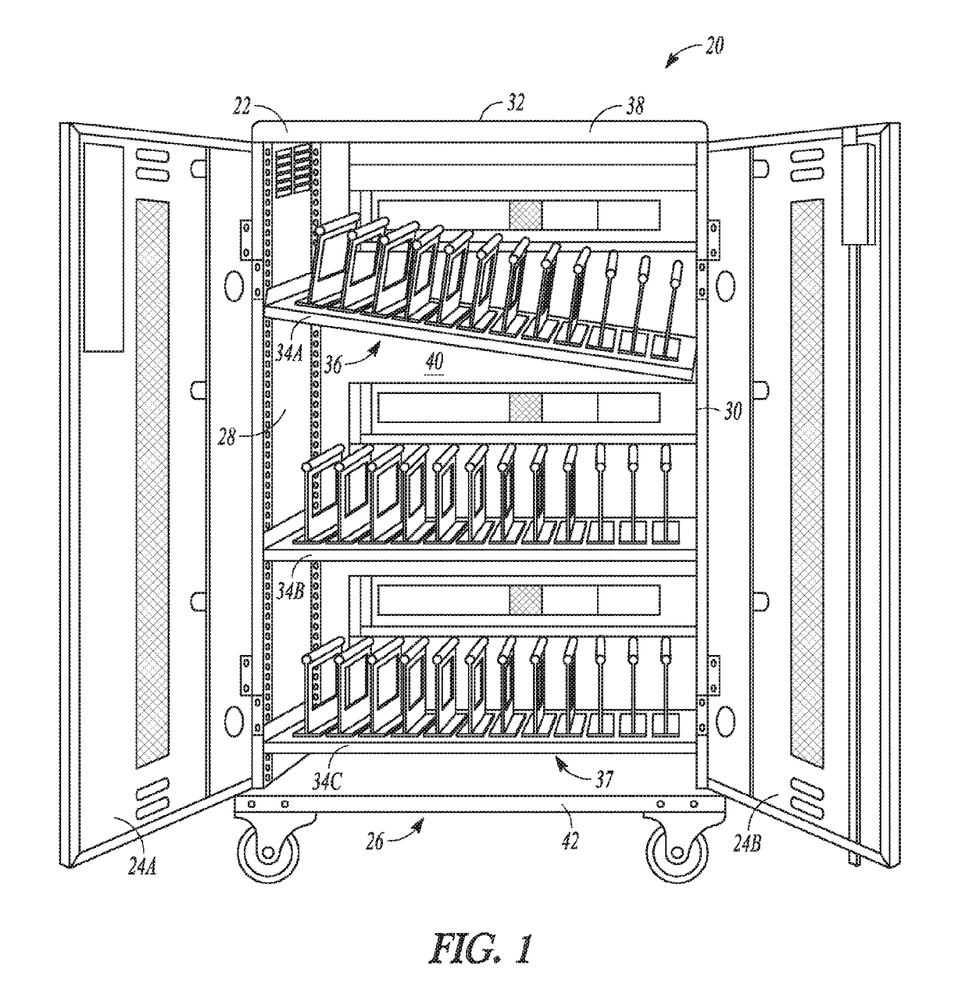
FIG. 1 is a front perspective view of a charging station configured to charge a plurality of portable electronic devices, e.g., tablet computing devices, in accordance with at least one example of the present disclosure.

FIG. 1 is a front perspective view of a charging station configured to charge a plurality of portable electronic devices, e.g., tablet computing devices, laptop computers, or mobile phones. The charging station 20, e.g., charging cart, can include a charging cabinet 22 that can serve as an overall structural member for the charging station 20. The charging station 20 can include a first door 24A and a second door 24B and is shown with its doors 24A, 24B in an open position 26. In some examples, the doors 24A, 24B can lock to secure the devices. The charging station 20 can include a first side 28, a second side 30, a connecting member 32, and a plurality of shelves 34A, 34B, and 34C positioned within the charging station 20 and configured to hold the electronic devices. In the example shown in FIG. 1, three shelves 34A-C are depicted with the shelf 34A (e.g. the top shelf) shown in an inclined position 36 that can be advantageous for installation. After installation, shelves 34B and 34C can be in a horizontal position 37.

The connecting member 32 can be one or more of a top member 38, a back member 40, or a base member 4. The connecting member 32 can form a structural bridge that can couple the first side 28 to the second side 30 and the connecting member 32 can form a structural member of the charging cabinet 22.

Figure 2:
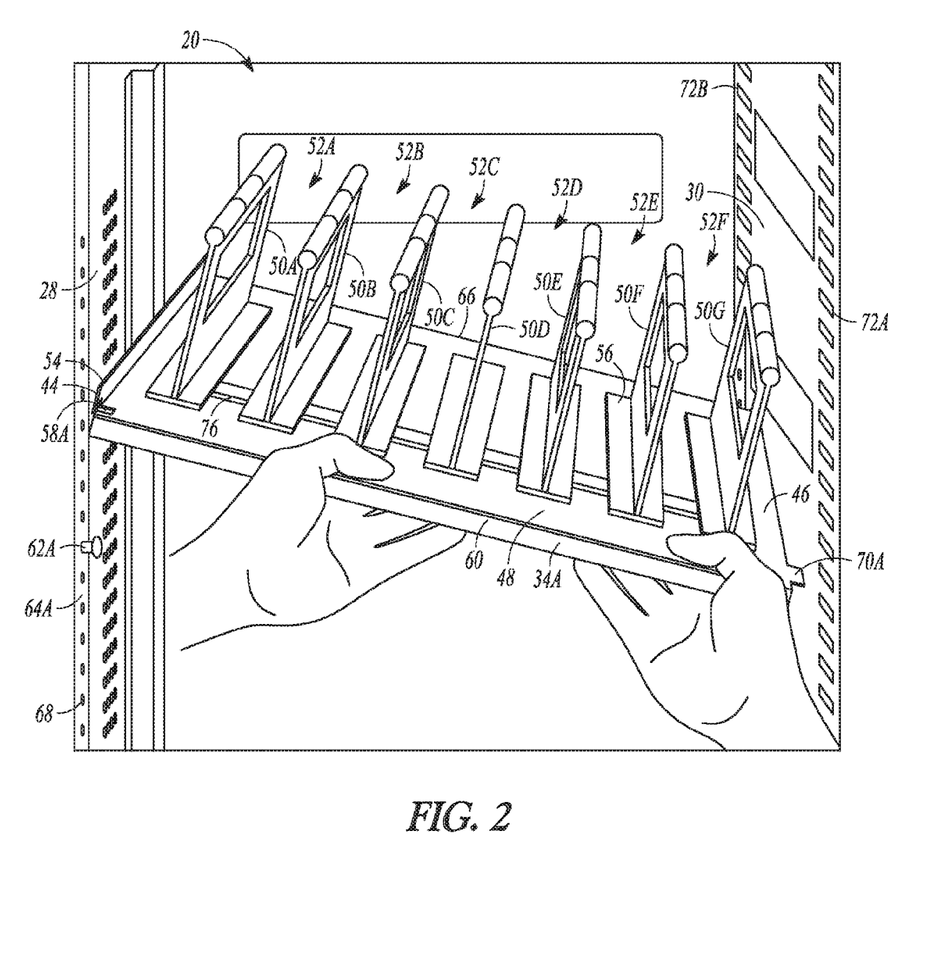
FIG. 2 is a front perspective view of a shelf that can installed in the charging station of FIG. 1, in accordance with at least one example of the present disclosure.

FIG. 2 is a front perspective view of a shelf 34A that can be installed in the charging station 20 of FIG. 1, in accordance with at least one example of this disclosure. In an example, as described below, the shelves 34A-C of the charging station 20 can be repositioned by loosening only two fasteners. This can be far more efficient that a conventional shelving system. As seen in FIG. 2, the shelf 34A can include a first end 44 and a second end 46 and a shelf surface 48 extending between the first end 44 and the second end 46. The shelf 34A can be configured to receive one divider or a plurality of dividers 50A-G. The dividers 50A-G can create a space for a docking station 52A-F between two dividers. In an example, each docking station 52A-F can include connections (e.g. connectors, wiring) for power and/or networking. The shelf 34A can further include an end flange 54 adjacent the first end 44 of the shelf 34A. The end flange 54 can extend upward from the shelf surface 48 and can extend along at least a portion of the width 56 of the shelf 36A.

In an example, the shelf 34A can include is a first bent slot 58A that can be located adjacent the first end 44 of the shelf 34A and toward the front side 60 of the shelf 34A. The first bent slot 58A can be configured to receive a first screw 62A positioned in one of a first series of holes 64A that can extend vertically along the first side of the charging station 20. In an example, the first bent slot 58A can be defined in part by a portion of the shelf surface 48 and in part by the end flange 54. Similarly, located adjacent the first end 44 of the shelf 34A and toward the back side 66 of the shelf 34A is a second bent slot 58B (see FIG. 5) configured to receive a second screw that can be positioned in one of a second series of holes 64B (see FIG. 3) that can extend vertically along the first side 28 of the charging station 20. The second bent slot 58B can be defined in part by a portion of the shelf surface 48 and in part by the end flange 54. The first and second bent slots 58A, 58B are shown in detail in FIG. 5.

In some examples, the holes 68 in the first side 28 and/or the second side 30 of the charging station 20 can be extruded from sheet metal. In some examples, the holes 68 can be formed with threads. In some examples, the holes 68 can be formed without threads. In some examples, self-tapping screws can be used to secure the shelves 34A-C in position.

In an example, a first tab 70A can be located adjacent the second end 46 of the shelf 34A and toward the front side 60 of the shelf 34A. The first tab 70A can be configured to be inserted into one of a first series of slots 72A that can extend vertically along the second side 30 of the charging station 20. In an example, a second tab 70B can be located adjacent the second end 46 of the shelf 34A and toward the back side 66 of the shelf 34A. In an example, the second tab 70B can be configured to be inserted into one of the second series of slots 72B that extend along the second side 30 of the charging station 20.

During installation, a user can loosely insert a first screw 62A into a first hole 68 within the first series of holes 64A, and loosely insert the second screw (not shown) into a second hole within the second series of holes 64B, (e.g., the first and second screws can be level with each other so that the shelf sits in a level position). The user can place the shelf 34A in an inclined position 36, as shown in FIG. 2, with the first end 44 higher than the second end 46. The user can then insert the first tab 70A into a first slot 74A within the first series of slots 72A and the second tab 70B into a second slot 74B within the second series of slots 72B (see FIGS. 4-5). After the user inserts the first and second tabs 70A-B, the user can move the shelf 34A into a horizontal position 37 (see FIG. 1), by lowering the first end 44 and resting the shelf 34A on the first and second screws 62A-B as the first bent slot 58A receives the first screw 62A and the second bent slot 58B (see FIG. 5) receives with the second screw 62B. Then, the user can tighten the first and second screws 62A-B to secure the shelf 34A in place.

As seen in FIG. 2, the shelf surface 48 can define a shelf slot 76 that can extend along at least a portion of the length of the shelf 34A. In some examples, shelf 34 can include a first slot flange 78A that can be formed down in the shelf slot 76 located in the shelf surface 48. The first slot flange 78A can add structural strength to the shelf 34A while also providing an edge at an appropriate distance from the shelf surface 48 that can be used to engage a locking tab of a divider made of semi-flexible material such as plastic.

Figure 3:
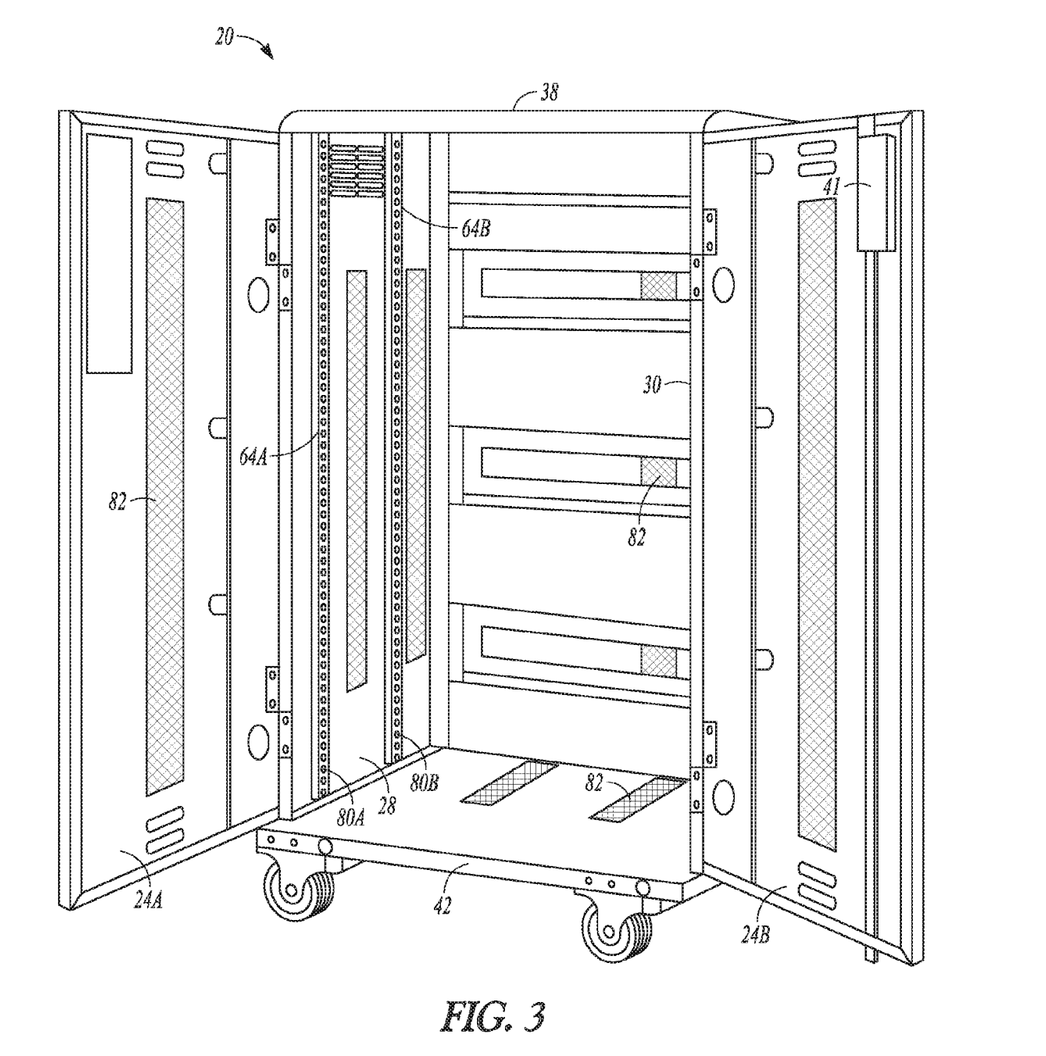
FIG. 3 is a front perspective view of the charging station of FIG. 1, with the shelves removed and showing the first side of the station, in accordance with at least one example of the present disclosure.

FIG. 3 is a front perspective view of the charging station 20 of FIG. 1, with the shelves 34A-C removed and showing the first side 28 of the charging station 20. In an example, as seen in FIG. 3, the first side 28 of the charging station 20 can include the first and second series of holes 64A-B for attachment of the first and second screws 62A-B, respectively. As described above some or all of the holes in the first and second series of holes may or may not be threaded. In some examples, the charging station 20 can include first and second rails 80A-B. In an example, the first and second rails 80A-B can be a separate member that can be coupled to or inserted into the first side 28. The first and second rails 80A-B can be shaped as channel-like, flat, or curved and can extend the whole vertical height of the first side 28 or one or more portions of it. The first and second rails 80A-B can be integrally formed with the first side 28 or configured as separate members that can be coupled to the first side 28. The first and second rails 80A-B can define, respectively, the first and second series of holes 64A-B. The charging station 20 can include various ventilation holes 8 that can be located in one or more of the doors 24A-B, the first and second sides 28, 30, the back member 40, the top member 38 and/or the base member 42. The charging station 20 can include a locking mechanism 41, that can be configured to lock the charging station 20 and protect any stored devices.

Figure 4:
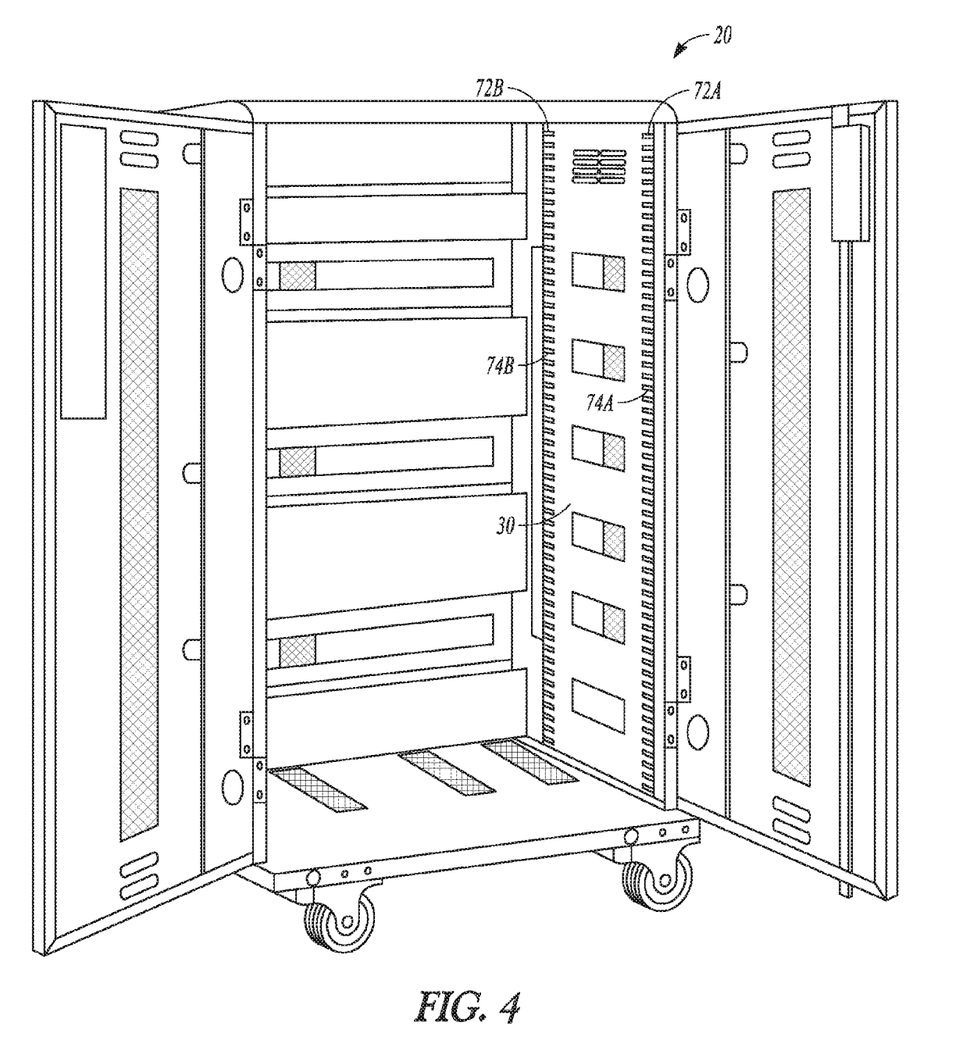
FIG. 4 is a front perspective view of the charging station of FIG. 1, with the shelves removed and showing the second side of the station, in accordance with at least one example of the present disclosure.

FIG. 4 is a front perspective view of the charging station of FIG. 1, with the shelves 34A-C removed and showing the second side 30 of the charging station 20. As seen in FIG. 4, the second side of the charging station, can include the first and second series of slots 72A-B that are configured to receive the first and second tabs 70A-B (see FIG. 5), respectively. In some examples, the positioning of the first and second slots 74A-B in the first and second series of slots 72A-B can be formed into the second side of the charging station such that the positioning defines, respectively, the positioning of the first and second series of holes 64A-B (see FIG. 3, e.g. and also positioning of individual slots and holes, such that shelves can be level when installed and have numerous shelf positioning configurations). In other examples, the slots can be formed into rails or separate members that can extend vertically along the second side 30.

Figure 5:
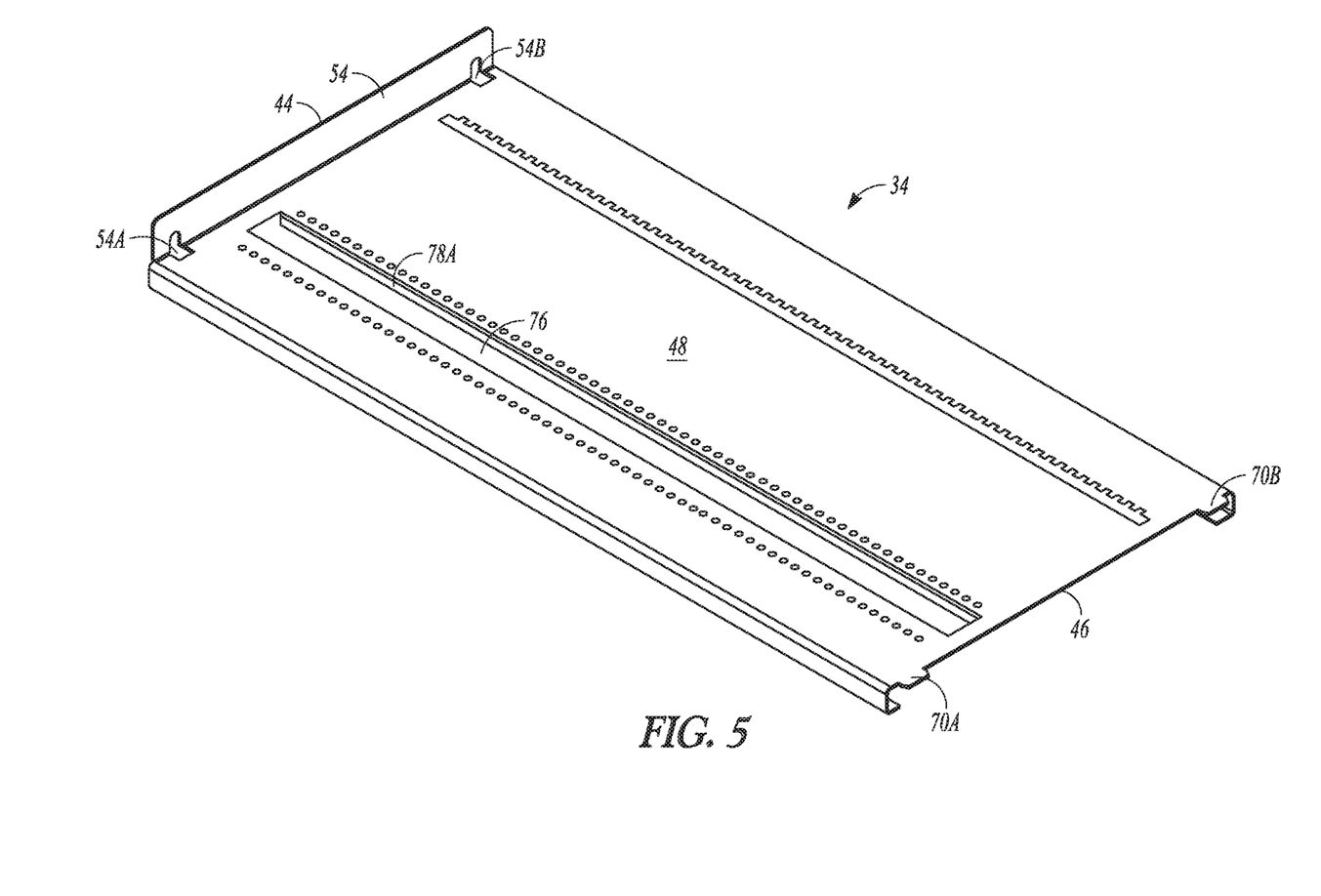
FIG. 5 is a top perspective view of an example of a shelf of a charging station, e.g., the shelf shown in FIG. 2, in accordance with at least one example of the present disclosure.

FIG. 5 is atop perspective view of an example of a shelf 34 of a charging station 20, e.g., the shelf shown in FIG. 2, in accordance with at least one example of this disclosure. As seen in FIG. 5, at the first end 44, the first bent slot 58A can be defined in part by a portion of the shelf surface 48 and in part by a portion of the end flange 54. Similarly, the second bent slot 58B can be defined in part by a portion of the shelf surface 48 and in part by a portion of the end flange 54. The portion of the first and second bent slots 58A-B defined by the shelf surface 48 can be large enough to receive the screw head of a screw installed in the series of holes that extend along a side of the charging station 20 (see FIG. 2). In an example, once the user adjusts the shelf 34 into a horizontal position 37 (see FIG. 1), the user can tighten the screws against the portion of end flange 54 that defines the first and second bent slots 58A-B. In an example, the second end 46 can include the first tab 70A and the second tab 70B.

As mentioned above, the shelf surface 48 can define a shelf slot 76 that can extend along at least a portion of the length of the shelf 34. In some examples, the shelves can include one or more slot flanges such as a first slot flange 78A formed down in the shelf slot located in the shelf surface. In some example configurations, the shelf 34 can include a second slot flange 78B. The first slot flange 78A can add structural strength to the shelf 34 while also providing an edge at an appropriate distance from the shelf surface 48 that can be used to engage a locking tab of a divider made of semi-flexible material such as plastic.

Figure 6A:
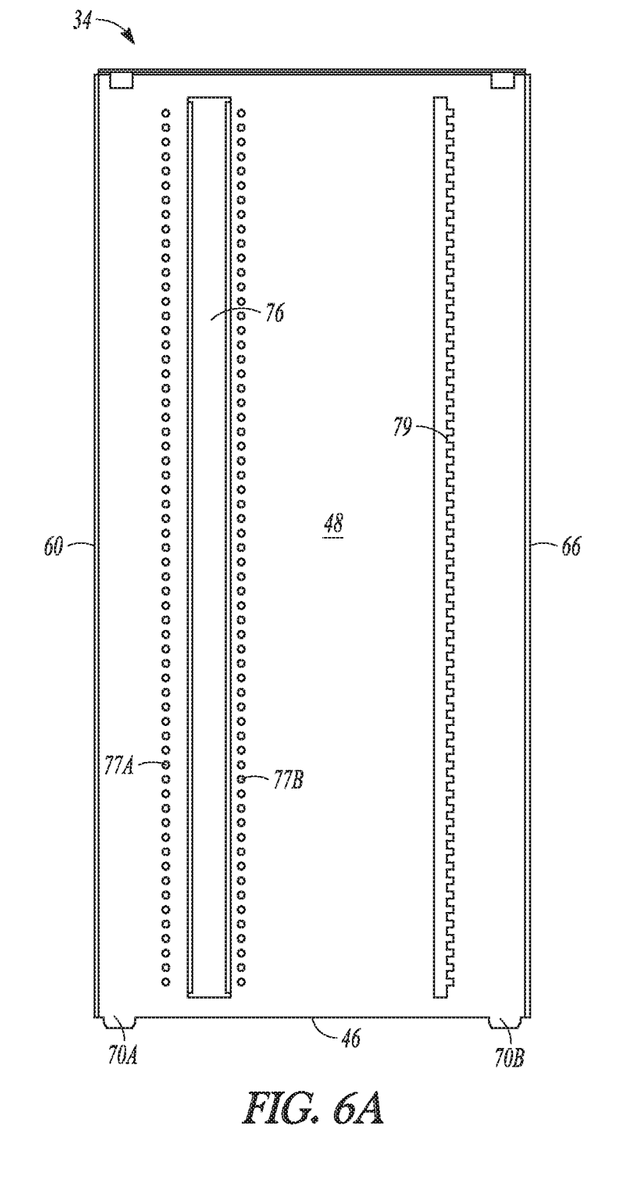
FIG. 6A is a top view of an example of a shelf of a charging station, e.g., the shelf shown in FIG. 2, in accordance with at least one example of the present disclosure.

FIG. 6A is atop view of an example of a shelf 34 of a charging station, e.g., the shelf shown in FIG. 2, in accordance with at least one example of this disclosure. As seen in FIG. 6A, the first and second tabs can extend outward from the second end 46 of the shelf. The shelf 34 can include one or more rows of attachment apertures as a first row 77A and a second row 77B near the shelf slot 76. The rows of attachment holes can aid in attachment of dividers such as dividers 50A-G (see FIG. 2) or used for cabling or ties strap attachment. The shelf 34 can include a rear slot 79 located in the shelf surface 48 near the back side 66. The rear slot 79 can include attachment features, such as a saw-tooth pattern, or square notch pattern as illustrated that can aid divider attachment and retention.

Figure 6B:
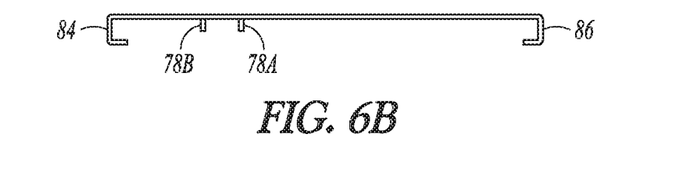
FIG. 6B is an end view of the shelf shown in FIG. 6A, in accordance with at least one example of the present disclosure.

FIG. 6B is an end view of the shelf shown in FIG. 6A. As seen in FIG. 6B, the front side 60 of the shelf 34 can include a front flange 84 and the back side 66 can a rear flange 86. The front flange 84 and the rear flange 86 can add structural strength to the shelf 34. The shelf 34 can include first and second slot flanges 78A-B that can be formed along the shelf slot 76 located in the shelf surface 48.

Figure 6C:
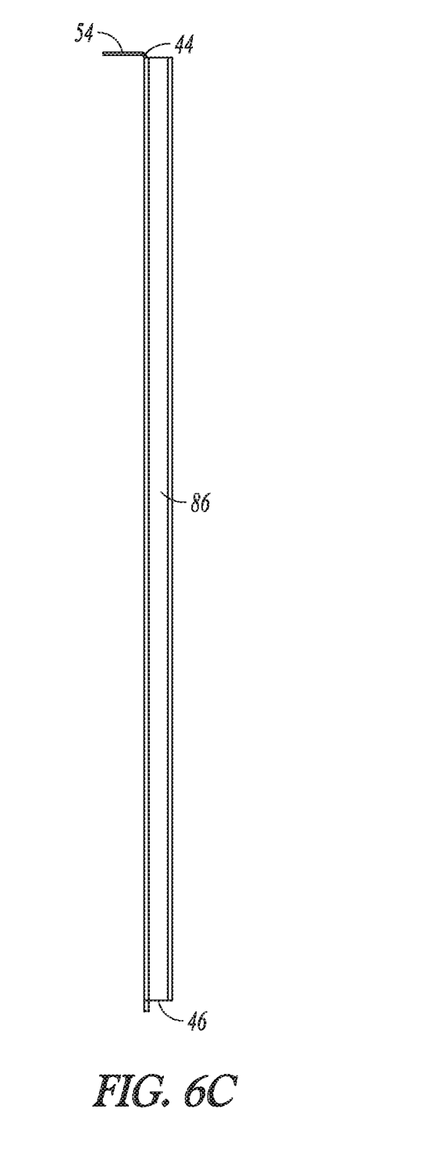
FIG. 6C is a side view of the shelf shown in FIG. 6A, in accordance with at least one example of the present disclosure.

FIG. 6C is a side view of the shelf shown in FIG. 6A. In the example shown in FIG. 6C, the end flange 54 can extend from the first side 44. In an example, any of the front flange 84 or rear flange 86 can be recessed near the first end 44 and/or second end 46 to provide clearance for tilting the shelf during installation.

The first and second series of threaded holes and the first and second series of slots (collectively "shelf supports") can be designed to provide any mounting arrangement the user can need. The shelves can be moved up or down as needed to fit user devices.

The shelf supports can include features that indicate the standard position of shelves. These features can improve ease of assembly and can be used as reference locations when the user is readjusting shelf location. In some example implementations, the features can include longer slots than the other slots in the mount. In some examples, the features can be a reference hole of nearly any shape placed next to the standard position slots.

The present disclosure provides a shelf having a total length (e.g. including tabs) at is longer than the space between the first and second sides. By providing a tab/slot configuration on one side, the user can incline the shelf, insert the tabs into one or more slots and by so doing allow the shelf (now having a shortened total length between the sides because of tab insertion) to lower to a horizontal position, whereby the bent slots on the first end can rest on a screw head or other type of protrusion, or simply be screwed into the first side. Although the shelf has been described and illustrated as having a regular rectangular shape with a tab near two corners of the second end and a bent slot near two corners of the first end, it should be recognized that the inventors have contemplated other shelf shapes as well as other tab/slot and bent slot/screw head configurations. In an example, the shelf shaped can be curved. In an example, instead of having two tab/slot configurations, the shelf can include one tab/slot pair. The unitary tab/slot pair can include a longer width dimension of the tab/slot for added stability. In an example, the shelf can include more than two tab/slot pairs, such as a shelf having three tabs and a second side including a third series of slots.

In an example, the inventors have contemplated using other types of fasteners on the first side in lieu of the screw. For example, bolts, push pins, or rivets can be used on the first side. In an example, the first and second series of holes can be replaced by a vertical series of male protrusions that can be integral or attached to the first side. They can protrude enough to catch and retain the bent slots, but be short enough not to impede the lowering of the shelf from the inclined position to the horizontal position.

Additional Notes and Examples

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventor also contemplates examples in which only those elements shown or described are provided. Moreover, the present inventor also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment.

The invention claimed is:

1. A charging station configured to charge a plurality of electronic devices, the charging station comprising:
   a charging cabinet having a first side, a second side, and
     a connecting member extending between the first and
     second sides;

a first plurality of holes extending along the first side, the first plurality of holes being configured to receive a first screw;
a second plurality of holes extending along the first side, the second plurality of holes configured to receive a second screw;
a first plurality of slots extending along the second side, the first plurality of slots being configured to receive a tab;
at least one shelf having a first end, a second end, and a shelf surface extending between the first and second ends, the first end of the shelf configured to be positioned adjacent the first side of the charging cabinet, the second end of the shelf configured to be positioned adjacent the second side of the charging cabinet, the at least one shelf including:
a first tab extending from the second end of the at least one shelf, the first tab configured to be inserted into one of the first plurality of slots extending along the second side; and
a shelf flange positioned at the first end; wherein a first portion of the shelf flange and a first portion of the shelf surface define a first opening through the shelf flange and a second opening through the shelf flange spaced away from the first opening, and wherein the first opening is configured to receive the first screw and the second opening is configured to receive the second screw.

2. The charging station of claim 1 comprising: a second plurality of slots extending along the second side, at least a portion of the second plurality of slots being configured to receive a tab; and
a second tab extending from the second end of the at least one shelf, the second tab configured to be inserted into one of the second plurality of slots extending along the second side.

3. The charging station of claim 1 comprising a divider coupled to the at least one shelf and configured to provide multiple spaces for electronic devices.

4. The charging station of claim 1, wherein the at least one shelf is divided into a plurality of docking stations, each docking station having connectors for a power supply and a network connection.

5. The charging station of claim 1, comprising a network connection system.

6. The charging station of claim 5, wherein the network connection system includes a wireless transmitter.

7. The charging station of claim 1 comprising a power supply system configured to provide electrical power to the plurality of electronic devices.

8. The charging station of claim 1, configured to include three shelves.

9. The charging station of claim 1, wherein the at least one shelf includes a front flange.

10. The charging station of claim 1, wherein the at least one shelf includes a rear flange.

11. The charging station of claim 1, wherein the at least one shelf includes at east one center flange.

12. The charging station of claim 1, wherein the connecting member is at least one of a back member, a base member, or a top member of the charging cabinet.

13. The charging station of claim 1, wherein the charging cabinet includes a wheeled base.

14. A charging station configured to charge a plurality of electronic devices, the charging station comprising:
a charging cabinet having a first side, a second side, and a connecting member extending between the first and second sides;
a first plurality of male positions extending along the first side, each of the first plurality of male positions being configured for one of 1) receiving a male fastener or 2) including an integral male protrusion;
a first plurality of slots extending along the second side;
at least one shelf having a first end, a second end, and a shelf surface extending between the first and second ends, the first end of the shelf configured to be positioned adjacent the first side of the charging cabinet, the second end of the shelf configured to be positioned adjacent the second side of the charging cabinet, the at least one shelf including:
a first tab extending outward from the second end of the at least one shelf parallel to the shelf surface, the first tab configured to be inserted into one of the slots of the first plurality of slots; and
a shelf flange extending from the first end, wherein a first portion of the shelf flange and a first portion of the shelf surface define a first opening, and wherein the first opening is configured to receive one of the integral male protrusion or the male fastener.

15. The charging station of claim 14, comprising:
a second plurality of male positions extending along the first side, the each of the second plurality of male positions being configured for one of 1) receiving a male fastener or including an integral male protrusion; and wherein a first portion of the shelf flange and a first portion of the shelf surface define a second opening, and wherein the second opening is configured to receive one of the male fastener or the male protrusion.

16. The charging station of claim 14, comprising:
a second plurality of slots extending along the second side, at least a portion of the second plurality of slots being configured to receive a tab; and
a second tab extending from the second side of the at least one shelf; the second tab configured to be inserted into one of the second plurality of slots extending along the second side.

17. The charging station of claim 14, comprising:
a second plurality of male positions extending along the first side, each of the second plurality male positions being configured for one of 1) receiving a male fastener or including an integral male protrusion; and wherein a first portion of the shelf flange and a first portion of the shelf surface define a second opening, and wherein the second opening is configured to receive one of the male fastener or the male protrusion;
a second plurality of slots extending along the second side, at least a portion of the second plurality of slots being configured to receive a tab; and
a second tab extending from the second side of the at least one shelf, the second tab configured to be inserted into one of the second plurality of slots extending along the second side.

18. The charging station of claim 14, wherein each of the plurality of male positions defines a hole and the male fastener is a screw.

* * * * *

UNITED STATES PATENT AND TRADEMARK OFFICE
CERTIFICATE OF CORRECTION

PATENT NO. : 10,283,983 B2
APPLICATION NO. : 15/183514
DATED : May 7, 2019
INVENTOR(S) : McCaffrey et al.

It is certified that error appears in the above-identified patent and that said Letters Patent is hereby corrected as shown below:

In the Specification

In Column 2, Line 20, before "Example 8,", insert --In--

In Column 2, Line 41, before "Example 14,", insert --In--

In Column 4, Line 49, delete "4." and insert --42.-- therefor

In Column 5, Line 4, delete "36A." and insert --34A.-- therefor

In Column 6, Line 20, delete "8" and insert --82-- therefor

In Column 6, Line 42, delete "atop" and insert --a top-- therefor

In Column 7, Line 4, delete "atop" and insert --a top-- therefor

In Column 7, Line 7, delete "outward" and insert --outwardly-- therefor

In Column 7, Line 45, delete "at" and insert --that-- therefor

In Column 8, Line 24, before "or one", insert --(--

In Column 8, Line 48, delete "or" and insert --(or-- therefor

In the Claims

In Column 9, Line 21, in Claim 1, delete "end;" and insert --end,-- therefor

In Column 9, Line 29, in Claim 2, after "comprising:", insert --¶--

Signed and Sealed this
Twenty-seventh Day of July, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 10,283,983 B2

In Column 9, Line 58, in Claim 11, delete "east" and insert --least-- therefor

In Column 10, Line 41, in Claim 16, delete "shelf;" and insert --shelf,-- therefor